(12) United States Patent
Tulupov et al.

(10) Patent No.: US 8,076,941 B2
(45) Date of Patent: Dec. 13, 2011

(54) BOTTOM SYSTEM FOR GEOPHYSICAL SURVEY (VARIANTS)

(75) Inventors: Andrey Vladimirovich Tulupov, Moscow (RU); Evgeniy Dmitrievich Lisitsin, Snkt-Peterburg (RU); Alexandr Arkadyevich Petrov, Snkt-Peterburg (RU); Vladimir Eduardovich Kyasper, Snkt-Peterburg (RU)

(73) Assignee: "EMMET" JSC, Moscow (RU)

( * ) Notice: Subject to any disclaimer, the term of this patent is extended or adjusted under 35 U.S.C. 154(b) by 476 days.

(21) Appl. No.: 12/316,100

(22) Filed: Dec. 9, 2008

(65) Prior Publication Data

US 2009/0224765 A1    Sep. 10, 2009

(30) Foreign Application Priority Data

Mar. 4, 2008   (RU) ................................ 2008107911

(51) Int. Cl.
*G01V 3/00* (2006.01)
*G01V 3/08* (2006.01)
(52) U.S. Cl. ...................................... 324/365; 324/345
(58) Field of Classification Search .................. 324/347, 324/348, 350
See application file for complete search history.

(56) References Cited

U.S. PATENT DOCUMENTS

| | | | | |
|---|---|---|---|---|
| 4,085,360 A | * | 4/1978 | Howell | 324/326 |
| 6,842,006 B2 | | 1/2005 | Conti et al. | |
| 2006/0238200 A1 | * | 10/2006 | Johnstad | 324/337 |
| 2008/0246485 A1 | * | 10/2008 | Hibbs et al. | 324/332 |

FOREIGN PATENT DOCUMENTS

| | | |
|---|---|---|
| RU | 2276388 | 5/2006 |
| RU | 54171 | 6/2006 |
| RU | 2294000 | 2/2007 |

* cited by examiner

*Primary Examiner* — Roberto Velez
(74) *Attorney, Agent, or Firm* — Aleksandr Smushkovich

(57) ABSTRACT

A bottom system related to equipment deployed for seabed geo-electrical survey is proposed, in preferred embodiments comprising a basic module, including registration and power supply means, or a combination of the basic module with at least one additional module: a magnetic characteristics measuring module or/and a seismic characteristics measuring module. The additional modules are connected with other modules through hermetic connectors. The modules are attached to a load with Kevlar straps, provided with an electrochemical release system. Arms with electrodes measuring electromagnetic characteristics of seabed, are attached to the basic module, in their initial position directed upwards at minimum 15° from the vertical, and fixed with fixing elements, connected with a releasing element of a device for descending and lifting the bottom station. The arms are made telescopic for convenient transportation. Independent embodiments without additional modules include a non-conductive conical member joined to the basic module and to the load.

3 Claims, 5 Drawing Sheets

BOTTOM SYSTEM FOR GEOPHYSICAL SURVEY (VARIANTS)

CROSS-REFERENCE TO RELATED APPLICATION

This U.S. patent application claims priority under 35 U.S.C. 119 (a) through (d) from a Russian Federation patent application No. 2008107911 filed on 4 Mar. 2008. This application also contains newly disclosed parts.

BACKGROUND OF THE INVENTION

The invention relates to the field of geophysical survey, specifically to equipment deployed for marine geo-electrical survey, in particular, utilizing methods of induced polarization, magneto-telluric and/or seismic survey, and it is intended for prognosis of hydrocarbons deposits and deposits of other mineral products, as well as for exploration of the earth's crust structure.

Currently, bottom systems with different structures and designations are widely known and used for marine geophysical survey and researches. Particularly, there are bottom seismic systems (RU 24890); Deep-water bottom self-emerging seismic system ADC-8/Soloviev S. L., Kontar E. A., Dozorov T. A., Kovachev S. A.//Izvestiya of the Academy of Sciences of USSR, Earth Physics, 1988, No. 9, p. 459-460; Ocean Bottom Seismometer (OBS) Systems. Company Profile Project Companies Kieler Umwelt und Meerestechnik GmbH (K.U.M.), Signal-Elektronik und Nets Dienste GmbH (SEND), April 2002, 11 p.), on the base of an underwater module, that comprises a hermetic body, provided with a device for setting the module on the sea-bottom, inside this module an apparatus for registration of hydro-acoustic signals with corresponding filters, formers, transformers, information accumulators, synchronization circuit, power source, and a device for determination of orientation of the underwater module are provided.

The main disadvantage of such systems is impossibility of complete and adequate transmission of the changing ground parameters onto the signal measuring sensors, installed on the supporting tubular frame, equipped with metallic mechanisms for throwing away and pressing to the ground, that in combination with the presence of border ground-metal causes additional inaccuracies at the acoustic signals passage and finally results in insufficient accuracy of the survey. Moreover (besides that), the use of the mechanisms for throwing away and pressing to the ground is not sufficiently effective (enough) because of their complexity, absence of control on their installation, that results in the placement of measuring sensors block in loose ground of the sea-bottom, and consequently leads to a loss in the working capacity of those system.

There are known bottom seismic systems of Sevmorgeo State Company construction (publicity booklet of Sevmorgeo), of buoy-based and self-emerging type. The systems of both types have a three-component geophone in gimbals mount, and a hydrophone. The buoy-based systems have a good transmission coefficient in the geophones channels due to great mass of the body; however the systems of this type have limitations on the setting depth, high risk of loss of the system, and require a sufficiently complex descending and lifting technology. The self-emerging type system comprises a spherical hermetic body encapsulating geophones, a power source, a registering device, and an electronic block of an acoustic release system of an electrochemical type. The hermo-body provides a positive floating of the whole system. It is used for setting the system on the sea-bottom by fixing it with elastic (rubber) straps to a concrete load through the release system.

Such system structure ensures high technological effectiveness of the descending and lifting operations, while carrying out the work at depths up to 6000 meters. However, a high position of displacement sensors relatively to the sea-bottom and elastic fastening of the system to the load reduces sensitivity of the system to the displacement waves.

There is known a self-emerging electromagnetic system (described in U.S. Pat. No. 5,770,945), which has body that contains of two orthogonal inductive magnetic field sensors, and the system of measuring of horizontal components of the electric field comprising horizontal semi-rigid arms fastened to the body, each arm having length of five meters, with electrodes located at the end of the arm.

The disadvantage of such system is insufficient measuring accuracy, and a limited range of application. Besides that, the system structure requires a vacant place on the deck with the area no less than 100 sq. meters and special descending and lifting equipment.

Another disadvantage of all of the above mentioned bottom systems is that they allow measuring only a specific group of parameters, that is conditioned by differences in requirements for exploiting the bottom systems of different types. The reviewed science-technical literature did not mention systems that allowed taking the seismic parameters along with the electromagnetic and/or magnetic strata characteristics.

The most similar in its technical essence to the inventive solution claimed herein is a self-emerging system for electromagnetic measuring taught in U.S. Pat. No. 6,842,006. The system has a body, a floating block, information collecting system, a load, and a load release system. The bottom system comprises a system for measuring of the horizontal components of the electric field, and arms, being a part of the measuring system. The arms are five meters long and have a diameter about five centimeters with electrodes. They form two orthogonal dipoles capable of movement in the vertical direction, that simplifies carrying out the descending and lifting operations, since it doesn't require taking away the system from the vessel board at a distance exceeding the arms' length.

The system comprises inductive sensors (from one up to four) that are usually located closer to the end of arms, for reduction of influence of the system's magnetic masses onto the results of measuring the magnetic field.

The disadvantage of the system is that its deployment is limited to only measuring the magnetic field parameters. Moreover, taking away the system off the board with the arms, directed upright down, increases a probability of damaging the electrodes and inductive sensors in case when during operation the water flow does not have enough time to move the arms into the vertical position, or bends one or several arms under the load, in particular, during operation on shallow water.

BRIEF DESCRIPTION OF THE INVENTION

The present invention is dedicated to improvement of self-emerging bottom systems, allowing to carry out survey and measurements of different parameters of the seabed strata, that ensures increased prognosis accuracy. The invention enhances convenience and reliability of operation of the bottom systems; in particular, having smaller volumetric dimensions in the pre-start position, and allows optimizing the descending and lifting operations.

The improvements have been achieved due to creation of a modular structure of the bottom system based on a combination of a basic module, destined for measuring electromagnetic characteristics of the seabed strata, with additional modules, containing equipment, which allows measuring other parameters of the seabed medium.

The claimed modular bottom system is characterized in that at least one additional module that measures other characteristics of the seabed strata is installed between the basic module and the bottom system's load. The bottom system includes registration and power supply devices that are located in the basic module and connected with other modules through hermetic connectors installed in the basic module's body, and the modules themselves are fixed to the load preferably by means of straps or ropes, preferably made of Kevlar, provided with a release system, preferably of an electrochemical type. The additional modules of the bottom system contain devices for magnetic and/or seismic measuring.

The registration devices include dipole arms. For convenient carrying out the descending-lifting operations, the arms are mounted to the lower part of the system body and in an initial position are directed upwards at an angle of no less than 15° from the vertical position and are secured by means of fixing elements connected with a releasing element of a descending-lifting device (DLD) (e.g. a cathead, crane, or manipulator), for example, with a 'painter hook'. For transportation convenience the arms are preferably made telescopic.

In one of the embodiments of the claimed bottom system, the basic module may be used independently (further called an 'independent variant'). In this case, a rigid conical member is installed between the module and the load, which conical member is made of non-conducting material, for example, polyethylene, polyurethane, or similar materials. The conical member is used for fixation of the basic module's body in the horizontal plane and prevention of adhesion of the basic module's body to the ground.

In some embodiments, a magnetic measuring module may be additionally attached with a semi-rigid bar to the basic module, that allows reducing influence of the basic module's magnetic masses onto the results of magnetic field measuring, for example while measuring transient electromagnetic fields (further called a 'bi-module variant'). Where the magnetic measuring module is joined to the basic module, the average distance from it to the magnetic sensors should be 0.5-0.8 meters. Influence of the magnetic masses decreases according to third power of the distance. For instance, the proposed system structure with a 5 meters bar ensures reduction of influence of the magnetic masses by 2.5-3 decades.

BRIEF DESCRIPTION OF DRAWINGS OF THE INVENTION

FIG. 1b represents a general side view of the basic module according to a preferred embodiment of the present invention shown on FIG. 1a.

DESCRIPTION OF PREFERRED EMBODIMENTS

Figure 1A:
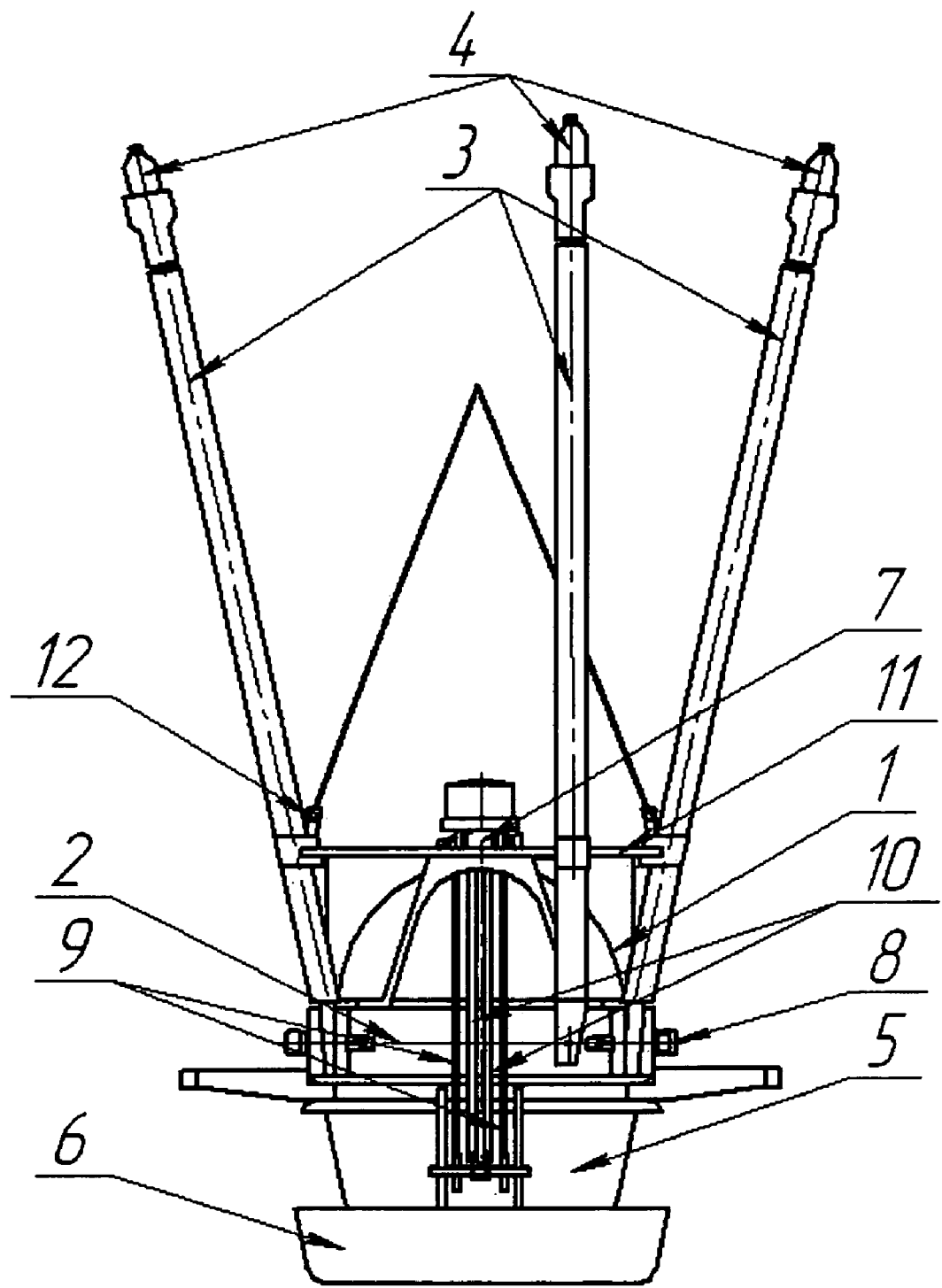
FIG. 1a represents a general front view of a basic module according to a preferred embodiment (independent variant) of the present invention.
Figure 1B:
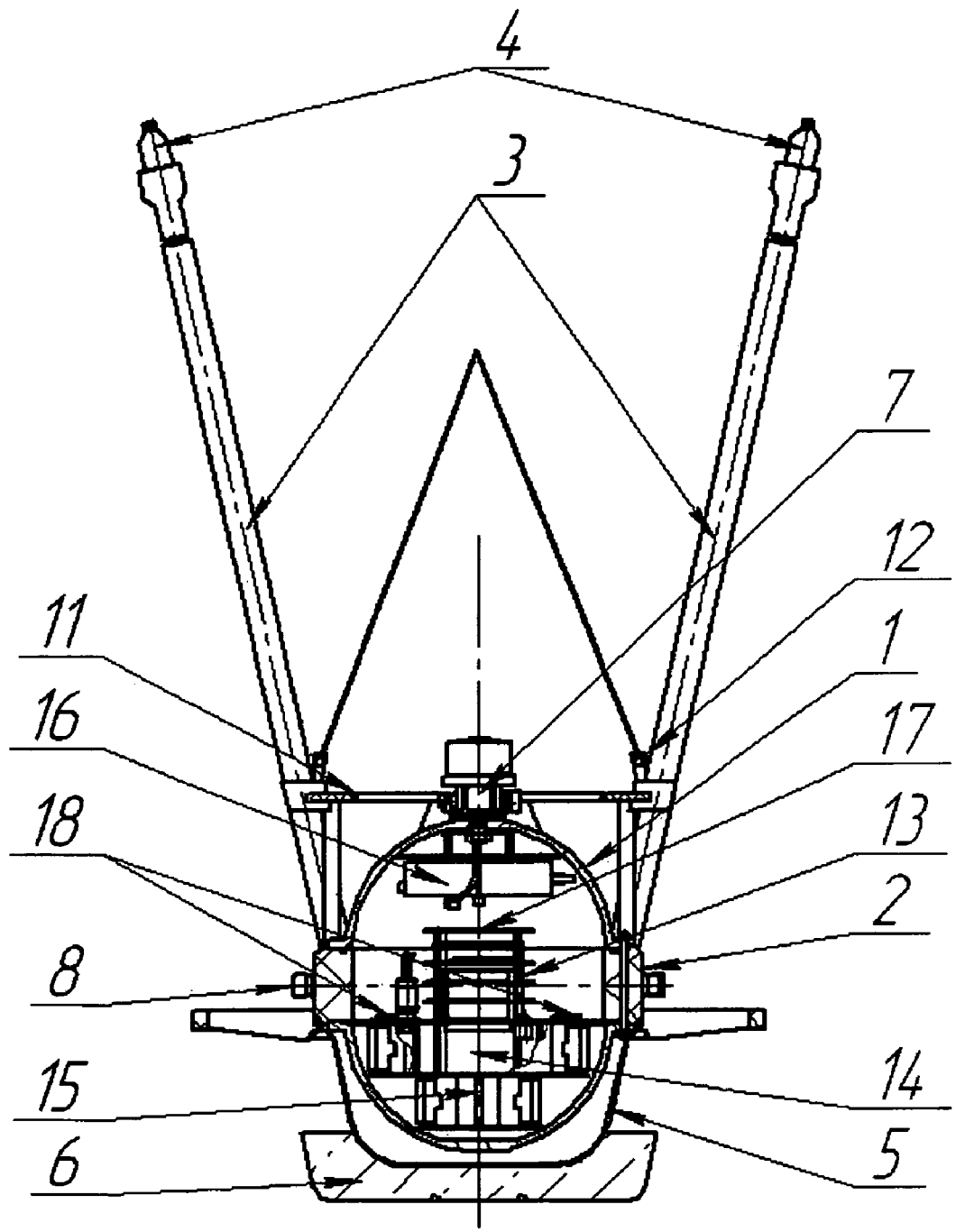
Figure 2:
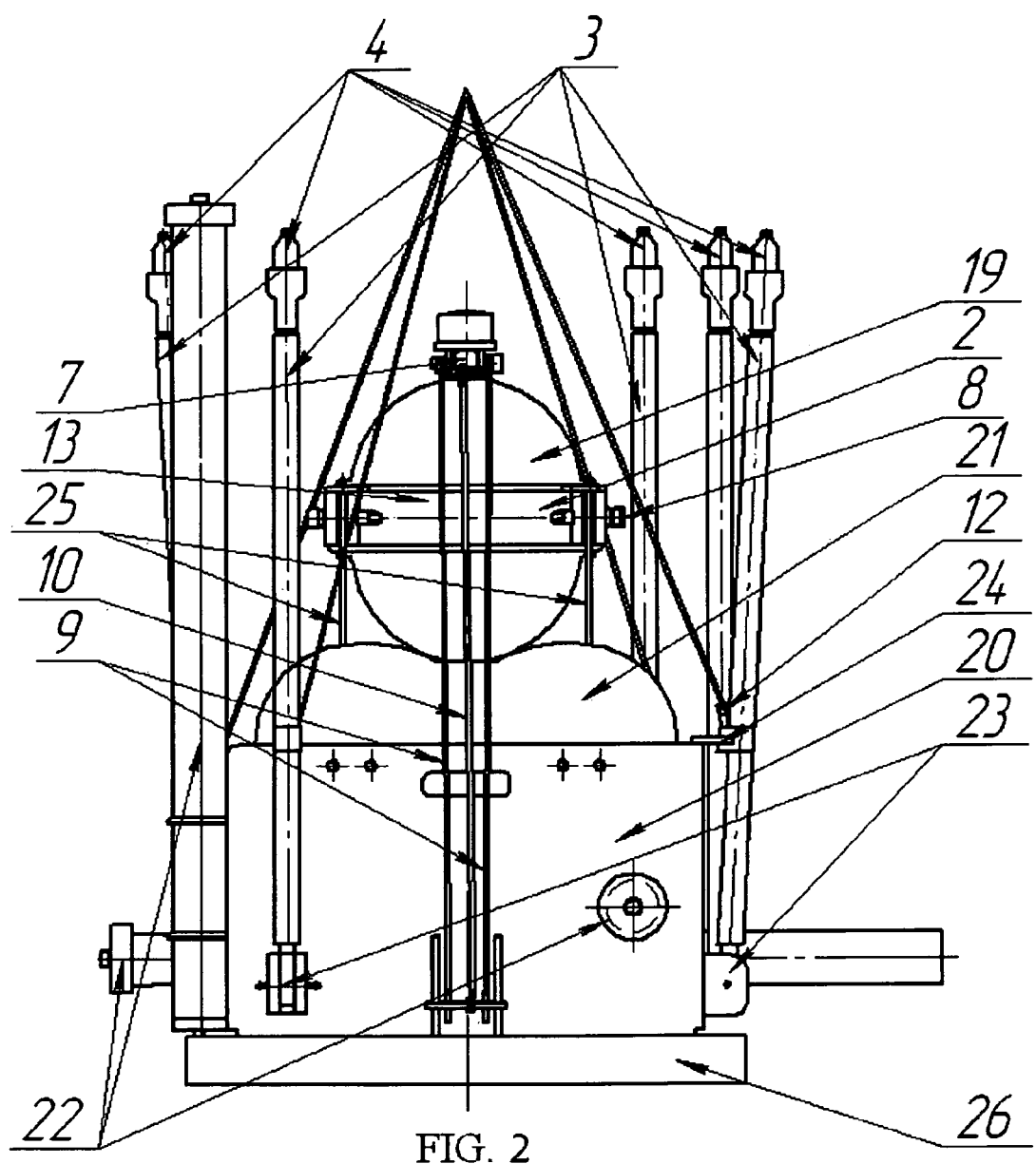
FIG. 2 represents a general view of a bottom system, comprising a basic module and a module for magnetic measuring, according to a preferred embodiment (bi-module variant) of the present invention, deployable in research of magnetotelluric fields, for measuring the orthogonal magnetic and electric field components at the same time.
Figure 3:
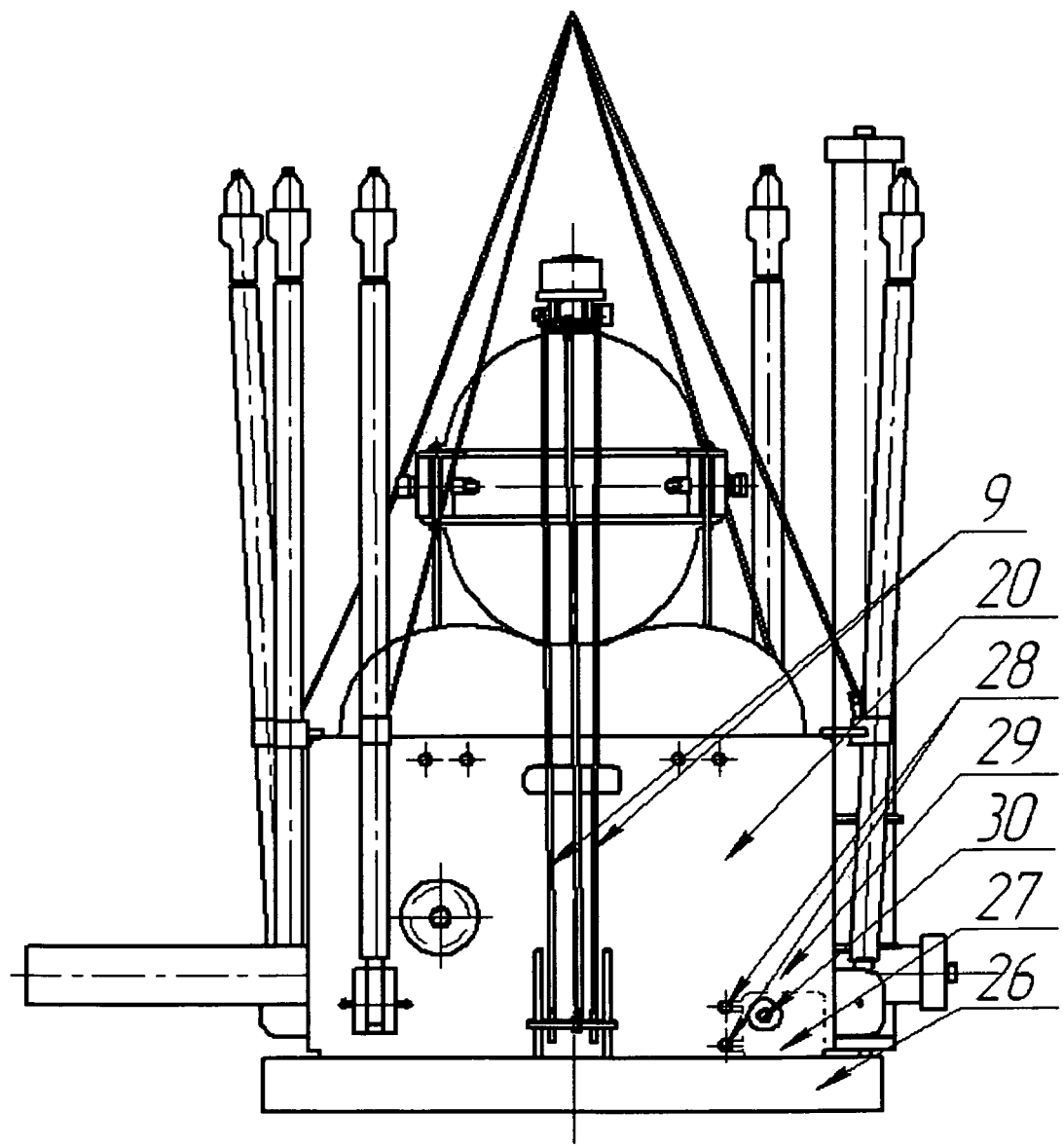
FIG. 3 represents a general view of a bottom system, including a basic module, a module for magnetic measuring, and a seismic-surveying module, used in case of necessity of simultaneous measuring of the electromagnetic and seismic fields (for example, during the work at the State network of key geological profiles), according to a preferred embodiment of the present invention.

While the invention may be susceptible to embodiment in different forms, there are shown in the drawings, and will be described in detail herein, specific embodiments of the present invention, with the understanding that the present disclosure is to be considered an exemplification of the principles of the invention, and is not intended to limit the invention to that as illustrated and described herein.

Figure 4:
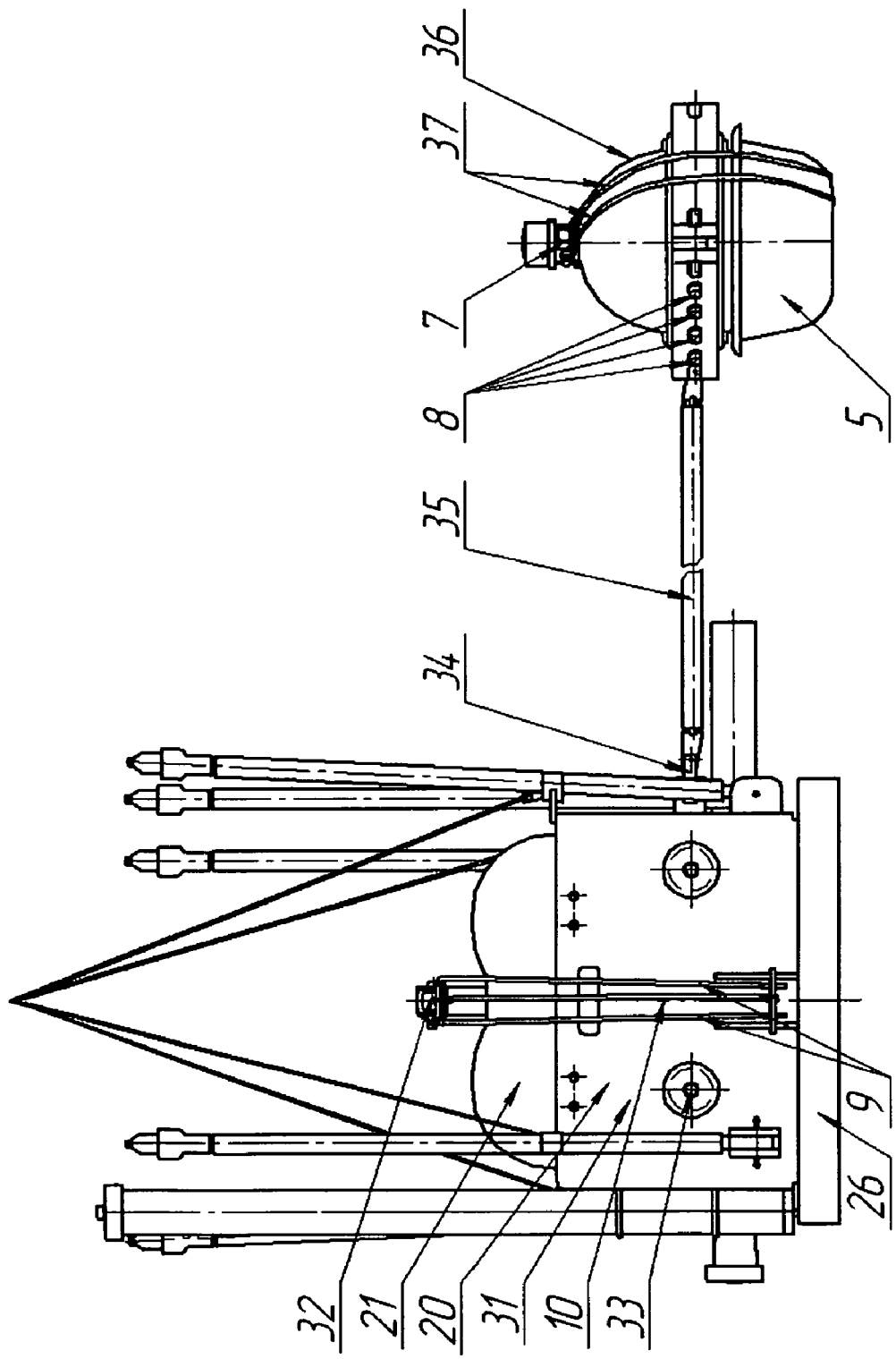
FIG. 4 represents a schematic view of the bi-module variant of a bottom system with a separated magnetic measuring module, according to a preferred embodiment of the present invention.

The following designations are used in FIGS. 1-4: 1—spherical hermetic body of a basic module, 2—insertion, 3—movable arms, 4—non-polarized measuring electrodes, 5—conical member (having a 'pot'-like shape, similar to a truncated cone), 6—load preferably made of concrete, 7—acoustic release system preferably of an electrochemical type, 8—hermetic connectors, 9—Kevlar straps, 10—elastic tension bar, 11—rail, 12—arm fixing element, 13—registration device, 14—main power unit, 15—power unit of the release system, 16—electronic block of the release system, 17—angle sensor, 18—preamplifiers of electric channels (FIG. 1a-1b), 19—basic module, 20—body of a magnetic measuring module, 21—floating block, 22—inductive sensors of the magnetic field, 23—fastening junctions of the arms, 24—stoppers, 25—studs, 26—load (FIG. 2), 27—body of a seismo-surveying module, 28—fastener, 29—hydrophone, 30—hermo-connector (FIG. 3), 31—module for magnetic measuring, 32—passive release system, 33—body of the angle sensor, 34—gimbals suspension, 35—semi-rigid bar, 36—basic module, 37—elastic tension bars (FIG. 4).

The body 1 of the basic module comprises two hemispheres preferably made of aluminum-magnesium alloy and the insertion 2 assembled with the hemispheres; the insertion 2 is preferably made of high-strength polyurethane or another similar material. The body 1 encapsulates the registration device 13, which structure allows mounting from one up to three four-channel electronic blocks with flash-card memory; the main power unit 14, the power unit of the release system 15, the electronic block 16, the three-component angle sensor 17, and the preamplifiers 18.

The insertion 2 is intended for providing additional positive floating to the module, as well as for fastening the arms 3 and installation of the hermo-connectors 8.

The arms 3 preferably have telescopic structure and are made of non-conducting material, for example, glass- or coal-reinforced plastic. A cable (not shown) is enclosed inside the arms 3 with the hermo-connectors, which serve for connection of the electrodes 4 and connection to a corresponding hermo-connector mounted on the insertion 2. The arms 3 for measuring of the horizontal components of electric field are fastened at the corners of the insertion 2 and may rotate freely around a horizontal axle. The arm 3 for measuring of the vertical component of electric field is rigidly fastened to the side surface of insertion 2. The arms length in the expanded position should be at least 5 meters.

In the independent variant, the body 1 through the rigid conical member 5, (preferably made of non-conducting material, for example, polyethylene or polyurethane) is connected to the concrete load 6. The conical member serves for fixation of the basic module body 1 in the horizontal plane and prevention of adhesion of the basic module body to the ground during installation of the systems on the sea-bottom.

The basic module 1 is rigidly fastened to the conical member 5 and to the load 6 through the release system 7, installed on the upper hemisphere, with the help of non-stretched straps 9, preferably made of Kevlar. The elastic (for example, made of rubber) tension bar 10 is inserted between the Kevlar strap 9 and the load 6 for creation of primary tension in the direction of release.

The upper rail 11 serves for protection of an acoustic antenna (not shown) of the release system 7 against damages, and for creation of an initial opening angle of the arms 3 (of at least 15 degrees from the vertical axe) and their fixation in this position before deployment.

The fixing elements 12 preferably have a wedge-shaped or conic form and serve for fixation of the arms 3 on the rail 11. The fixing elements 12 are connected by means of straps or ropes with the releasing element of the DLD (e.g. cathead, crane, or manipulator—not illustrated), for example, with the 'painter hook'. The length of the ropes of the fixing elements 12 is chosen in such a way, that the fixing elements should be released under the action of the system weight in water after actuation of the releasing element of the DLD. The fixing elements 12 together with the ropes are to remain on the DLD for subsequent settings of the system.

In case of necessity of measuring several parameters of the electric field, another embodiment of the present invention can be employed, providing installation of at least one additional module for magnetic or seismic measuring between the basic module and the load.

The basic module 19 (shown on FIG. 2) with the additional four-channel block of the registration device 13 is rigidly fixed to the floating block 21 with the help of the studs 25, made of non-magnetic material, for example, brass. The floating block 21 may be made of standard glass spheres or syntactic foam and is joined to the body 20 of the module for magnetic measuring in the upper region thereof.

The body of the magnetic measuring module 20 is made of non-conducting material, for example, polyethylene or polypropylene. The inductive sensors 22 and the fastening junctions 23 of the arms 3 are located in the lower region of the body 20.

The fastening junctions 23 provide free movement of the arms 3 in the vertical plane, and are disposed in such a way that in the expanded position the arms would be situated in parallel with the corresponding inductive sensor 22.

The arms 3 are attached to the stopper 24 at the initial opening angle with the help of the fixing elements 12. The inductive sensor 22 and the arm 3 for measuring the vertical components of magnetic and electrical fields correspondingly are rigidly fixed in the vertical position to the body 20 on the opposite sides.

The electrodes 4 of the arms 3 and the inductive sensors 22 are connected with the registration device 13 through the hermo-connectors 8, located on the insertion 2. Fastening of the system to the load 26 is carried out through the release system 7 with the help of the above-described Kevlar straps 9 and the tension bars 10.

The body 27 of the seismo-surveying module (shown on FIG. 3) has a cylindrical shape (as illustrated on FIG. 3), or a hemisphere-cylindrical or another suitable shape (not illustrated) and is made of non-magnetic material, for example, aluminum-magnesium alloy. In the upper region of the body 27, there is mounted the hydrophone 29; and the hermo-connector 30 is mounted on the side surface of the body 27.

The body 27 is internally rigidly attached to the side surfaces of the body 20 of magnetic measuring module in such a way, that the lower surface of the body 27 would be flush-mounted with the lower edge of the body 20, and the hermo-connector 30 would come out through the technological aperture of the body 20 for convenience of connecting to the basic module. The basic module in this embodiment includes the registration device 13 with at least one four-channel electronic block installed therein. A three-component geophone (not shown) is mounted inside the body 27, which geophone is rigidly joined to the bottom of the body 27.

Since the body 20 of the module for magnetic measuring is attached to the load 26 by means of the non-stretched Kevlar straps 9, the body 27 of the seismo-surveying module and the geophones installed at its bottom are rigidly connected with the massive load 26, that sharply increases the system sensitivity to the displacement waves. Another positive factor, affecting the quality of receiving of the transverse waves, is absence of the gimbals suspension in the system of geophones, since the basic module has the three-component angle sensor 17.

The bi-module variant of the bottom system allows to reduce the influence of the magnetic parts of the basic module onto the results of measuring of the magnetic field, for example during operation with transient electromagnetic fields.

In this variant, the module for magnetic measuring 31 (with the seismic module or without it), illustrated on FIG. 4, is joined to the load 26 by the straps 9 with the help of tension bars 10 through the passive release system 32, installed on the floating block 21. The hermetic body of the angle sensor 33 with the three-component angle sensor is mounted on the body 20. The module 31 is joined with the basic module 36 by the semi-rigid bar 35.

The bar 35 is made of non-conducting material, for example, polyethylene; it may be disassembled for transportation convenience and has a hollow shape, for example, a tube. The length of the bar 35 in the assembled position is at least 5 meters. The bar 35 is joined with the body 20 through the gimbals suspension 34, made of non-conducting material, for example polyurethane. The gimbals suspension 34 provides free movement of the bar at 180 degrees in the horizontal plane and at 160 degrees in the vertical plane. The bar 35 is attached to the basic module in the place of fastening of one of the movable arms 3.

A multiple-strand connecting cable (not shown) with the branching on the ends is placed inside the semi-rigid bar 35 for electrical connection with the hermo-connectors of the sensors and the blocks of module 31, and with the hermo-connectors 8 of the basic module. The basic module 36 is located in the conical member 5 and is fastened thereto by the elastic tension bars 37 through the acoustic release system 7. The conical member 5 is made heavier for ensuring the basic module with negative floating up to 1-2 kg. The passive release system 32 is actuated according to a signal from the acoustic release system 7, transmitted through the aforementioned connecting cable.

Operation of Preferred Embodiments of the Invention

The bottom system operates as follows. Before the deployment of the bottom system, one chooses a prescribed combination of the above-mentioned modules and the system is assembled according to the combination, connecting the contacts from the sensors of the additional modules and the electrodes of the arms to the registration device 13 of the basic module through the hermo-connectors 8 located on the insertion 2.

The arms are extended and fastened to the stopper 24 at the initial opening angle with the help of the fixing elements 12. The inductive sensor 22 and the arm 3 for measuring the vertical components of the magnetic and electrical field are correspondingly rigidly fixed in the vertical position to the body 20 on the opposite sides. In case of necessity, the module for magnetic measurement 31 is installed. It is connected to the basic module 36 by the semi-rigid bar 35. Fastening of the system to the load 26 is accomplished through the release system 7 with the help of the Kevlar straps 9 and the tension bars 10.

With the help of the DLD, the system is lowered from the vessel board into the water, after that the 'painter hook' is opened. The bottom system begins submerging due to gravity force. The fixing elements 12 are released. During the descending, the arms are retained in a quasi-vertical position due to the water flow.

When reaching the sea-bottom, arms open and take the horizontal position under because of gravity force.

After receiving an initialization signal from the vessel board, the bottom system begins operating in the prescribed mode. At the end of operation, a finalizing signal is transmitted to the release system 7, which causes the straps 9, connecting the load 6 (and the conical member 5, if applicable to the prescribed mode) and the system modules, to be released, and the bottom system ascends.

The proposed modular structure of the bottom system allows registering different parameters of the seabed strata.

The aforesaid manner of setting the magnetic measuring module and seismo-surveying module on the system allows ensuring sensitivity of their sensors, exceeding the analogous parameters of the known systems with such measuring devices of the same type. The proposed inventive system is more compact and convenient in use.

We claim:

1. A bottom system for measuring characteristics of seabed strata, comprising:
    a floatable basic module including electromagnetic sensor means, registration means, and power supply means;
    a load for fixing said bottom system to the seabed;
    a load release means;
    at least one additional module for measuring other parameters of the seabed strata including parameter sensor means;
    connector means for hermetic connection of at least said registration means and said power supply means to said parameter sensor means; and
    attachment means for releasable fastening said basic module and said at least one additional module to said load through said load release means.

2. The bottom system according to claim 1, wherein said at least one additional module for measuring other parameters includes a measuring magnetic module measuring magnetic characteristics of the seabed strata.

3. The bottom system according to claim 1, wherein said at least one additional module for measuring other parameters includes a seismic measuring module, measuring seismic characteristics of the seabed strata.

* * * * *